US012559304B2

(12) United States Patent
Nelson et al.

(10) Patent No.: US 12,559,304 B2
(45) Date of Patent: Feb. 24, 2026

(54) SECURE BIN FOR SELECTIVE DEPOSIT

(71) Applicant: Oracle International Corporation, Redwood Shores, CA (US)

(72) Inventors: Jennifer Nelson, Mountlake Terrace, WA (US); Michael Hunter, Tega Cay, SC (US); Ismael Rangel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 18/122,992

(22) Filed: Mar. 17, 2023

(65) Prior Publication Data

US 2023/0219747 A1 Jul. 13, 2023

Related U.S. Application Data

(63) Continuation of application No. 16/862,363, filed on Apr. 29, 2020, now Pat. No. 11,643,271.

(Continued)

(51) Int. Cl.

*B65F 1/00* (2006.01)
*B65F 1/10* (2006.01)

(Continued)

(52) U.S. Cl.

CPC ................ *B65F 1/006* (2013.01); *B65F 1/10* (2013.01); *B65F 1/1431* (2013.01);

(Continued)

(58) Field of Classification Search

CPC ............ B65F 2250/11; B65F 2210/128; B65F 2210/148; B65F 2210/152; B65F 1/006;

(Continued)

(56) References Cited

U.S. PATENT DOCUMENTS 1,184,156 A * 5/1916 Winkler, Jr. ............. B65D 9/14 217/15
1,364,209 A 1/1921 Richardson (Continued)

FOREIGN PATENT DOCUMENTS

CN 203515128 U 4/2014
GB 190017729 * 2/1901

(Continued)

*Primary Examiner* — Don M Anderson
*Assistant Examiner* — Elizabeth J Volz
(74) *Attorney, Agent, or Firm* — Trellis IP Law Group, PC

(57) ABSTRACT

One example embodiment is adapted for use in facilitating collection and transport of memory devices, e.g., drives, motherboards, etc., e.g., for the purposes of subsequent destruction. The example embodiment has an outer bin, also called a garage or outer enclosure, within which is placed an inner bin with wheels. Once closed and locked, the outer bin has a door that can be opened so drives or other memory devices can be inserted. The drives then fall into the inner bin and, once sufficiently filled, the inner bin be easily wheeled out from the outer bin. The inner bin has its own locking lid that is secured when transporting the inner bin with the drives, e.g., to a destruction facility or area. Other features are provided as described below. Enhanced synergistic security features include use of multi-point locking latches to secure doors and lids, metal construction of the bins, and so on. The bins are sized to facilitate efficient collection and transport of potentially sensitive data center media.

13 Claims, 11 Drawing Sheets

Related U.S. Application Data

(60) Provisional application No. 62/993,539, filed on Mar. 23, 2020.

(51) Int. Cl.
*B65F 1/14* (2006.01)
*B65F 1/16* (2006.01)

(52) U.S. Cl.
CPC .......... *B65F 1/1473* (2013.01); *B65F 1/1615* (2013.01); *B65F 2210/128* (2013.01); *B65F 2210/138* (2013.01); *B65F 2210/148* (2013.01); *B65F 2210/152* (2013.01); *B65F 2250/11* (2013.01)

(58) Field of Classification Search
CPC ........ B65F 1/10; B65F 1/1473; B65F 1/1615; B65F 1/1426; B65F 1/04
USPC ........... 232/43.1, 43.2, 43.3; 220/908, 908.1, 220/908.3
See application file for complete search history.

(56) References Cited

U.S. PATENT DOCUMENTS

| | | | | | |
|---|---|---|---|---|---|
| 3,722,236 | A | | 3/1973 | Zelenko | |
| 5,105,968 | A | * | 4/1992 | Fiterman | B65F 1/10<br>220/825 |
| 5,667,136 | A | | 9/1997 | Chen | |
| 7,256,691 | B2 | * | 8/2007 | Awobue | A47G 29/1214<br>340/569 |
| 7,428,980 | B2 | | 9/2008 | Irwin | |
| 7,469,849 | B1 | * | 12/2008 | Lo | B02C 18/0007<br>241/285.2 |
| 8,523,050 | B1 | | 9/2013 | Andreozzi | |
| 9,554,646 | B1 | * | 1/2017 | Charette | A47G 29/141 |
| 2003/0085266 | A1 | * | 5/2003 | Simon | A47G 29/1207<br>232/27 |
| 2005/0166647 | A1 | * | 8/2005 | Walls | E05C 9/20<br>70/107 |
| 2006/0283929 | A1 | | 12/2006 | Lim | |
| 2014/0263216 | A1 | * | 9/2014 | Clark | G11B 23/505<br>241/47 |
| 2017/0222863 | A1 | | 8/2017 | Franca-Neto | |

FOREIGN PATENT DOCUMENTS

| | | | | | |
|---|---|---|---|---|---|
| JP | 2017125364 | | | 7/2017 | |
| WO | 2009114582 | A3 | | 12/2009 | |
| WO | WO2012015664 | | * | 2/2012 | B65D 55/00 |
| WO | 2014075409 | A1 | | 5/2014 | |

* cited by examiner

SECURE BIN FOR SELECTIVE DEPOSIT

CROSS REFERENCES TO RELATED APPLICATIONS

This application is a continuation of the following application, U.S. patent application Ser. No. 16/862,363, entitled SECURE DESTRUCTION BIN, filed on Apr. 29, 2020, which claims the benefit of U.S. Provisional Patent Application Ser. No. 62/993,539 entitled SECURE DESTRUCTION BIN, filed on Mar. 23, 2020, which is hereby incorporated by reference as if set forth in full in this application for all purposes.

BACKGROUND

The present application relates to collection bins and accompanying mechanisms and methods for facilitating secure collection and subsequent transport of items collected in the bins.

Mechanisms for facilitating secure collection of items in preparation for transport and/or subsequent destruction are employed in various demanding applications, including mail collection, document collection and destruction, computer memory device collection and disposal, and so on.

Secure collection and subsequent transport of items can be particularly important for collection and disposal of hard drives and other electronics from data centers, where such devices can store particularly large amounts of potentially sensitive information.

Conventionally, data center items (e.g., hard drives, etc.) slated for transport and/or disposal are collected in relatively insecure bins. The bins are often plastic; have relatively weak locking mechanisms, if any; often use unsecure deposit slots, and so on. Removal of items from the bins may require hand-picking items from the bin, or in some cases, from the floor after items have spilled from an opened bin door. The process can be inefficient, and items may be lost or otherwise unaccounted for.

SUMMARY

Generally, embodiments relate to an apparatus, system and method for facilitating secure collection and transport of items containing potentially sensitive material. For instance, the items may include documents and/or electronic media, such as hard drives, motherboards, solid state drives, and so on, that are slated for destruction and disposal.

One example embodiment employs repositories or "bins" to efficiently and securely accept and store the items, e.g., drives, in reparation for subsequent secure transport and disposal. An inner bin is positioned within an outer bin (also called a garage enclosure, or simply garage). Once closed and locked, the outer bin has a secure chute for accepting drives into the outer bin, which then fall into the inner bin. The inner bin includes wheels and a lockable lid. Once the inner bin is sufficiently filled, it can be rolled out of the outer bin (via a lockable door of the outer bin). The lockable lid of the inner bin is secured when moving the inner bin with the drives to a destruction facility or area.

Additional features include multi-point (e.g., 3-point) lockable latches used to secure the inner bin lid and the outer bin door; secure lift-off hinges that facilitate removal of the outer bin door when opened; inner bin locating guard tracks; a scanning mechanism for facilitating tracking objects placed into the bin; metal inner and outer bin construction; the outer bin is sized and dimensioned to approximately fit a data center tile; and so on. Dimensions of the inner bin and outer bin are also configured for space efficiency and for efficiently accommodating data center items, e.g., drives.

Accordingly, various embodiments discussed herein employ nested secured bins, including an easily transportable locking inner bin, where the nested bins are sized and secured to facilitate data center applications, e.g., drive-destruction applications. Embodiments also obviate or reduce incidences of handling of individual items, i.e., obviate excess media touches. Excess media touches (e.g., including touches when hand-picking items out of a collection bin) can be inefficient and can increase the risk of lost or stolen items.

A further understanding of the nature and the advantages of particular embodiments disclosed herein may be realized by reference of the remaining portions of the specification and the attached drawings.

BRIEF DESCRIPTION OF THE DRAWINGS

FIG. 5 shows a cross-sectional view of the secure collection bin system of FIGS. 1-4, as indicated in FIG. 4, and further illustrates additional features, including an inner bin lower-edge bevel, a rod catch for a rod of a multi-point lockable latch, a rear chamber stopper, and so on.

DETAILED DESCRIPTION OF EMBODIMENTS

Large computer processing sites, such as data centers, cloud service providers, etc., may have an ongoing need to destroy large numbers of digital memory devices such as magnetic or solid state drives, motherboards, random-access-memory, USB drives, or other types of physical devices (generally, "drives"). Often the information on the drives to be destroyed is proprietary or otherwise sensitive, so the containment and transport of the drives to a destruction facility must be done securely.

For clarity, certain well-known components, such as hard drives, processors, operating systems, power supplies, databases, automatic door or hatch actuation mechanisms (e.g., motors), and so on, are not necessarily explicitly called out in the figures. However, those skilled in the art with access to the present teachings will know which components to implement and how to implement them to meet the needs of a given implementation.

Figure 1:
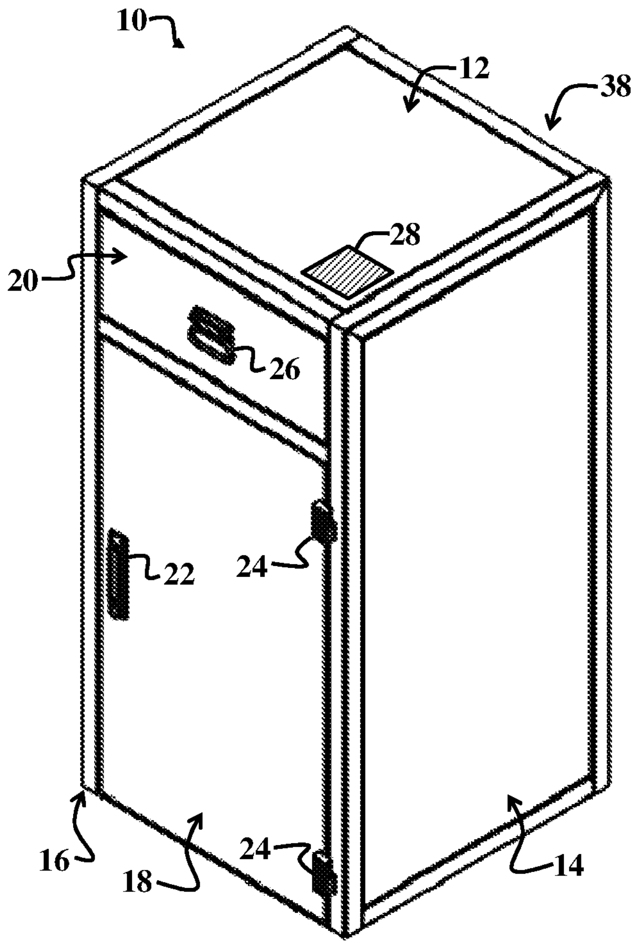
FIG. 1 shows a first example embodiment of a secure collection bin system in a closed configuration, whereby an upper security chute door and an outer bin door are closed and locked.

FIG. 1 shows a first example embodiment of a secure collection bin system 10 in a closed configuration, whereby an upper security chute door 20 and an outer bin door 18 are closed and locked. The upper security chute door 20 (also simply called the upper door) includes a folding handle 26 for facilitating manually opening the security chute door 26 to expose an inner slide or chute for receiving items into the secure bin collection system 10.

The secure collection bin system 10 includes an outer housing 38 formed via metal panels, including an upper panel 12, a right-side panel 14, and a left side panel 16. In the present specific embodiment, the outer bin door 18 provides access to an inner chamber of the secure collection bin system 10, as discussed more fully below. The outer bin door 18 is coupled to the right side panel 14 of the housing 38 via secure lift-off hinges 24.

The outer bin door 18 further includes a lockable latch handle (or other actuation mechanism, e.g., knob) and key opening 22 to facilitate securely and selectively latching, locking, unlocking, and opening the outer bin door 18. In the present specific embodiment, lockable latch handle and/or lever and key opening 22 is coupled to a multi-point locking and latching system (also simply called a multi-point lockable latch), as discussed more fully below.

Accordingly, when the outer bin door 18 is closed, and a key is employed to lock the outer bin door via the key opening 22, the resulting multi-point mechanism secures the outer bin door shut at multiple points behind the outer bin door 18, making it particularly difficult for unauthorized personnel to pry open the outer bin door 18. This substantially enhances security over mechanisms that simply lock a door shut at one point.

For illustrative purposes, the example secure collection bin system 10 is shown further including an item-scanning mechanism 28. The scanning mechanism may include an optical, Radio Frequency Identification (RFID), bar code, and/or other type (or types) of scanner (or scanners). Labels of items to be deposited in the secure collection bin system 10 can be scanned and then analyzed by underlying software coupled to the scanning mechanism 28. The scanning mechanism 28 may electrically communicate with an electronic lock and/or electronic motor that facilitates opening, either manually, or automatically, the security chute door 20. This can be particularly useful in applications where the disposal of certain items must be first authorized. The codes on items that have not been authorized for disposal may be unusable as keys to enable opening the security chute door 20. This may inhibit undesirable inadvertent disposal of certain items.

Furthermore, information about (and codes associated with) items that have been deposited in the secure collection bin system 10 may be maintained in database that communicates with the scanning mechanism 28.

In other embodiments, the scanning mechanism 28 may include a camera that takes a picture of each item that is placed in the secure collection bin 10, and then simply stores the picture of the item, e.g., to facilitate tracking (as needed) of items that were placed in the secure collection bin 10.

In yet other embodiments, the scanning mechanism 28 may incorporate functionality for creating images or other copies of drive content, which can be then offloaded to a larger data storage mechanism and database, e.g., in advance of destruction of the associated drive(s).

Figure 2:
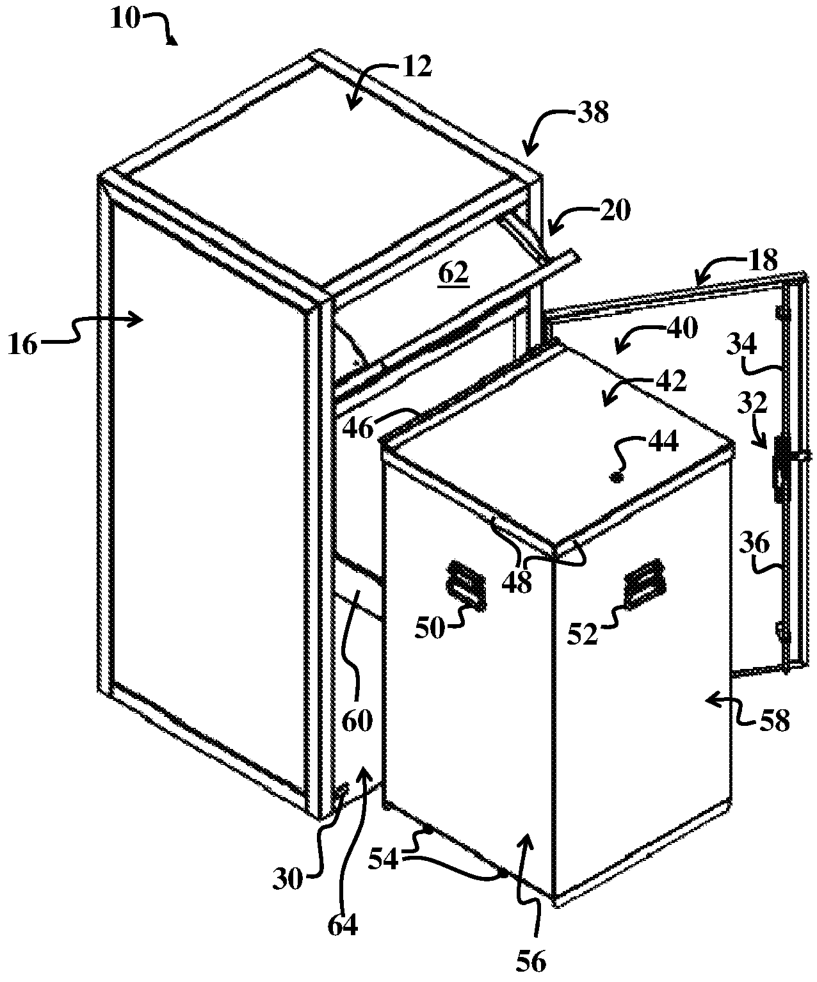
FIG. 2 shows the example secure collection bin system of FIG. 1 in a first partially open configuration, showing an inner bin removed from an inner chamber of the outer bin, wherein a secure folding inner bin lid is closed and locked, and showing an open security chute door.

FIG. 2 shows the example secure collection bin system 10 of FIG. 1 in a first partially open configuration, showing an inner bin 40 removed from an inner chamber (also called the inner compartment) 64 of the outer bin 38, wherein a secure folding inner bin lid 42 is closed and locked, and showing an open security chute door 20 exposing a chute and slide 62.

The inner bin 40 includes wheels 54 (e.g., castor wheels) and folding handles 50, 52 mounted on sides 56, 58 of the inner bin 40. The inner bin 40 further includes a foldable lid 42, which can be folded shut about a lid hinge 46. The foldable lid 42 includes a lip 48 that extends around an upper edge of the housing of the inner bin 40 when the foldable lid 42 is closed. The lip 48 extends approximately perpendicularly from a surface of the lid 42. The lip 48 is configured to substantially increase security over other designs that do not have the lip 48. For instance, the lip 48 reduces the effectiveness of a crowbar in prying open the lid 42.

Note that inner bin lid 42 is substantially free of large protrusions, curves, or bends extending upward from the lid 42. This enables the top surface of the lid 42 to rest substantially flush against a back panel of the inner bin 40 when the lid is fully opened, e.g., as discussed more fully below with reference to FIG. 3.

Note that the inner chamber 64 of the outer bin 38, which accommodates the inner bin 40 with relatively tight tolerances, includes various additional features. For instance, a bin-locating track 60 (also called an internal bin locating guard track, an inner bin locating track, or simply a guard track) facilitates precise positioning of the inner bin 40 in the inner chamber 62 of the outer bin 38, as discussed more fully below.

Furthermore, an example outer bin door lower rod catch 30 is shown in the inner chamber 64. Note that an inside portion of the open outer bin door 18 shows a multi-point lockable latch mechanism(s) 32, which is coupled to the key opening 22 and accompanying latch actuation mechanism (e.g., handle, knob, lever, etc.) on the other side of (i.e., on the outside of) the outer bin door 18.

The multi-point lockable latch mechanism 32 includes (and/or is otherwise rotatably coupled to) an upper securing rod 34 and a lower securing rod 36. When the center of the multi-point lockable latch mechanism 32 is actuated (e.g., via a key and accompanying actuation mechanism, e.g., lever, knob, or other suitable mechanism), this selectively extends or retracts the rods 34, 36. When the rods 34, 36 are extended relative to the center of the multi-point lockable latch mechanism 32, the ends of the rods 34, 36 fit into rod catches (e.g., the lower rod catch 30) in the outer bin housing

38. Accordingly, the outer bin door 18 becomes secured at both the top and bottom of the door 18 (when closed). Furthermore, another lever or lip of the multi-point lockable latch mechanism 32 may rotate into position to grab a portion of the frame of the left side panel 16, thereby further securing the outer bin door 18 at a third position.

Accordingly, the multi-point lockable latch mechanism 32 represents a 3-point locking mechanism that includes use of vertically actuatable rods and a rotatably actuated lever mechanism, which can be moved via use of the actuation mechanism and key opening 22 shown in FIG. 1.

The upper security chute door 20 is shown in an open position, exposing a chute and slide 62, where the chute and slide 62 provide opening through which items can be placed. Items placed in the chute and slide 62 represent items that slide down the associated opening or chute when the upper door, i.e., security chute door 20, is closed.

The slide of the chute and slide 62 extends far enough back to inhibit people from reaching in and around the security chute door 20. Furthermore the dimensions of the chute and slide 62 are selected to accommodate both particular data center security requirements and the ability to accommodate various sizes and types of media (e.g., drives, motherboards, etc.) commonly disposed of by data center personnel.

Note that generally, when the upper security chute door 20 is opened for accepting items, the inner bin 40 will be locked into the inner chamber (also called an inner chamber or lower compartment) 64 with the inner bin lid 42 in an open position. The outer bin door 18 will also be locked shut using a multi-point locking and latching mechanism, e.g., the 3-point lockable latching mechanisms 30-36.

In summary, FIG. 2 illustrates an embodiment in a first configuration of a containment system. In FIG. 2, the outer bin, or "garage," 38 is rectangular (e.g., a right-angled parallelepiped) with dimensions of approximately 24"×24" and 48" tall. Other dimensions are possible but these are chosen to fit standard data center "tiles" or units of floor measurement for rack mounted types of devices. This allows the bins to easily fit in standard data center spacings. The more precise dimensions for international data center tile specifications are 600 mm×600 mm (about 23.6"×23.6") and the height can generally be variable as the vertical space is usually not restricted until about ceiling height (if there is a ceiling).

Although specific measurements, shapes, materials and other characteristics are provided, it should be apparent that, unless otherwise specified, it is often possible to deviate from any one or more characteristics without affecting the functionality. One set of design requirements allows the measurements to vary by +/−2%. A second set allows +/−5%. A third +/−10% and a fourth +/−20%. In other applications and embodiments it is possible to use any suitable characteristics such as measurements or materials that differ greatly from what is presented herein.

In an embodiment, outer bin 38 is formed of steel or other suitable material to provide a tamper-resistant enclosure. The upper security chute door 20 is open, exposing the chute and slide 62.

The upper security chute door (also called the top door) 20 can be pulled down to reveal the attached shelf (also called slide) and side panels that form chute and slide 62. Note that the width of the chute and slide 62 extends substantially across a lateral dimension of the outer bin inner chamber or compartment 64. Furthermore, the upper security chute door 20 is rotatably coupled to the outer bin housing 38.

A drive placed in the chute and slide 62 will slide down the chute once the upper security chute door 20 is closed. A front handle (26 of FIG. 1) on the security chute door 20 allows a human operator to open and close the top door. In other alternative embodiments, the upper security chute door 20 is automatically electrically actuated open or closed.

The bottom door (also called the outer bin door) 18 is hinged on one side to swing open and allow the inner bin 40 to be rolled into or out of the outer bin 38. The inner bin 40 fits inside the outer bin 38, beneath the chute and slide 62 of the security chute door 20.

The inner bin 40 is shown in FIG. 2 with flip-top lid (also called the inner bin lid) 42 in the closed position. Before inserting inner bin 40 into outer bin 38, the flip-top lid 40 is swung open—pivoting on hinges 46 at its rear—to rest essentially flat against the back side of the inner bin 40. This allows the inner bin to be rolled into the outer bin without the flip-top lid 42 unduly preventing full use of the interior space of outer bin 38.

Inner bin 40 includes a front handle 52 (and side handle 50) so that inner bin 40 can be easily rolled out from outer bin 38. Wheels 54 at the four corners of inner bin 40, partially shown at 54, can be of the heavy-duty caster type. Other designs may be used. Guard rails or tracks, such as the rail 60 (opposite rail not shown in FIG. 2) can be provided to help center the inner bin 40 inside the outer bin 38. In an embodiment the inner bin measures approximately 20" wide×20" deep×35.66" tall.

The flip-top lid (also called folding lid or inner bin lid) 42 can be provided with a locking mechanism and keyed access such as by an inner bin keylock 44. The keylock 44 may be coupled to another multi-point lockable latch mechanism that enables securing the flip-top lid 42 at multiple points along a front the inner bin lid 42, similarly to how the outer bin door 18 is secured and locked shut via the key opening 22 of FIG. 1.

In the present example embodiment, when removing and inserting the inner bin 40 into, and removing it from, the outer bin chamber 64, the outer bin door 18 is opened at least to a sixty degree angle relative to a right surface of the inner bin 40 or relative a plane approximately parallel thereto, e.g., a plane of an outer surface of the right panel 14 shown in FIG. 1.

Figure 3:
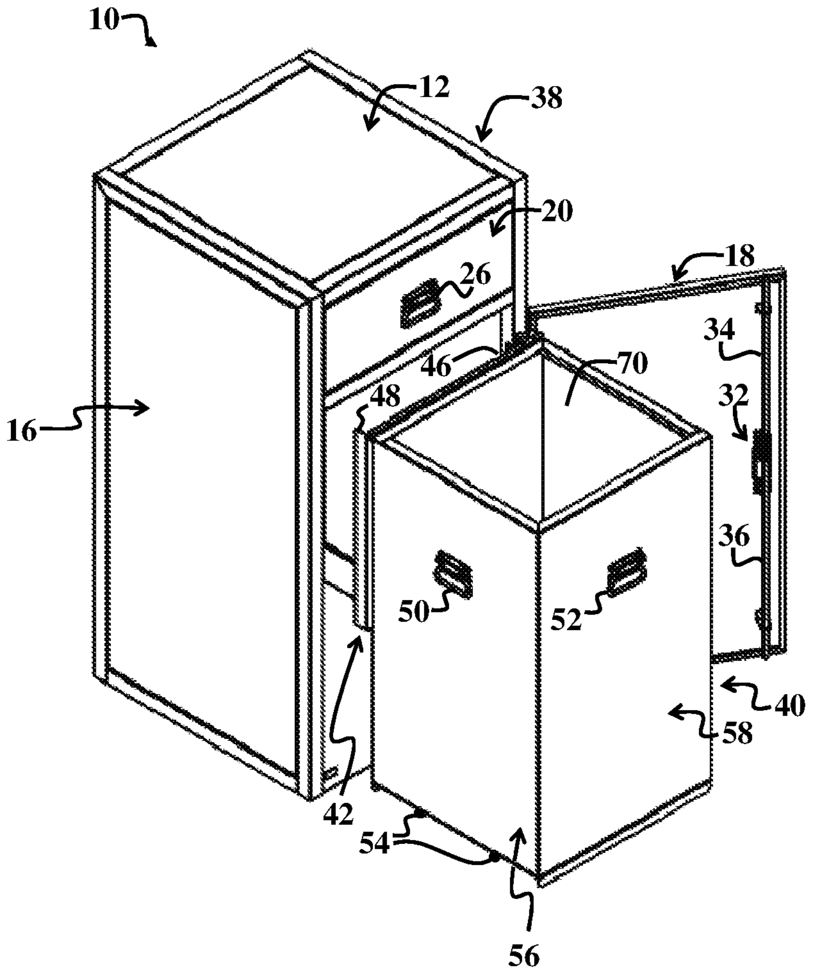
FIG. 3 shows the example secure collection bin system bin system of FIG. 2 in a second partly opened position, showing the folding inner bin lid in an open position, where a top surface of the inner bin lid is approximately flush with a back panel of the inner bin.

FIG. 3 shows the example secure collection bin system 10 of FIG. 2 in a second partly opened position, where the folding inner bin lid 42 is open, and where a top surface of the inner bin lid 42 is approximately flush with a back panel of the inner bin 40.

When the inner bin lid 42 is opened, this exposes a second inner chamber or compartment 70, for accommodating media deposited therein via the security chute door 20.

In summary, FIG. 3 illustrates a second configuration of the system 10 of FIGS. 1 and 2. In FIG. 3, the inner bin 40 is shown with its flip-top lid 42 in the open position with the lid pivoted by hinges 46 to lay against the back of the inner bin 40. This would be the position of the lid 42 just before inner bin 40 is wheeled into the outer bin 38; or just after the inner bin 40 has been wheeled out of outer bin 38.

Note that many variations are possible from the system 10 described with reference to FIGS. 1-3. For example, sizes of the upper and lower doors 20, 18 may be changed. Hinges can be placed on different sides, and different hinge types may be used. In some cases it may be desirable to have the flip-top lid 42 be completely removable (as is the lower door 18 via the lift-off hinges 24 of FIG. 1, as discussed more fully below). Or a different mechanism may be used, such as a one-way entry chute to the top of the inner bin 40. In different embodiments, outer bin 38 may be secured to the floor by bolting or gluing or other means. Multiple inner bins may be used, etc. Many variations are possible.

Additional embodiments can provide active components, such as scanners, to detect and identify the types of devices that are being deposited into the containment system. A scanner can be positioned at the entry point to the chute of the outer bin so that a user can hold a bar code, QR code, RFID tag, visible number or pattern or other type of identifier to an imager. The imager can capture the identification of the device being inserted and the information can be provided to a local or central computing system for tracking and inventory purposes, or for other purposes. The scanner may be placed elsewhere in the containment system such as at a point between outer bin 38 and inner bin 40 so that the item being deposited can be scanned as it falls into the inner bin.

In an embodiment, the locks for the tops of multiple inner bins can be keyed the same so that a master key can be provided to a recipient of the multiple inner bins that can be used to unlock all of the bins. This makes it more efficient for a recipient of the bins, such as a destruction facility, to open and process the devices.

Figure 4:
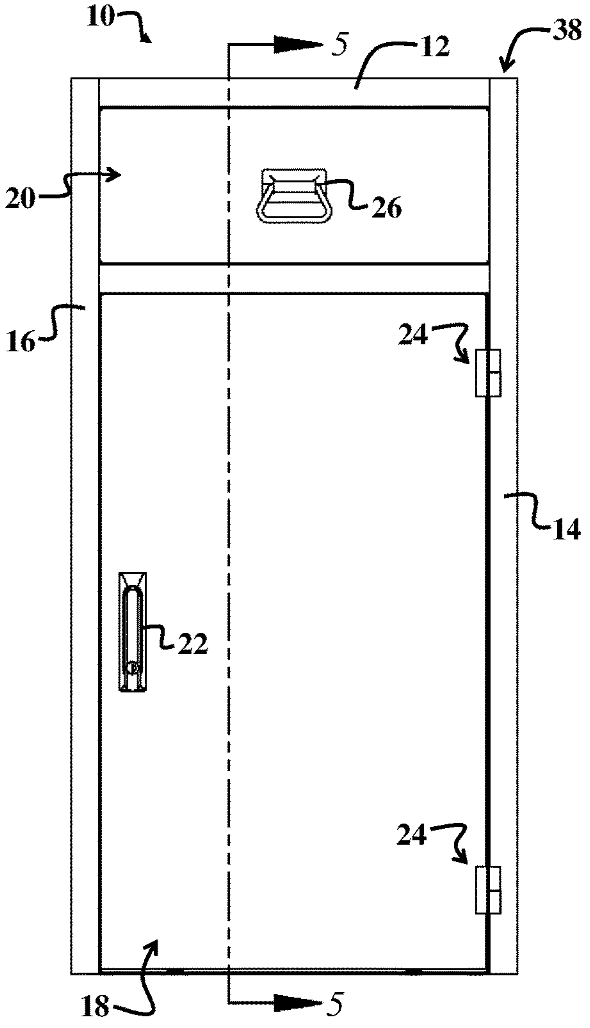
FIG. 4 shows a front view of the example secure collection bin system of FIGS. 1-3, and further shows cross-section lines corresponding to a cross-sectional view of FIG. 5.
Figure 5:
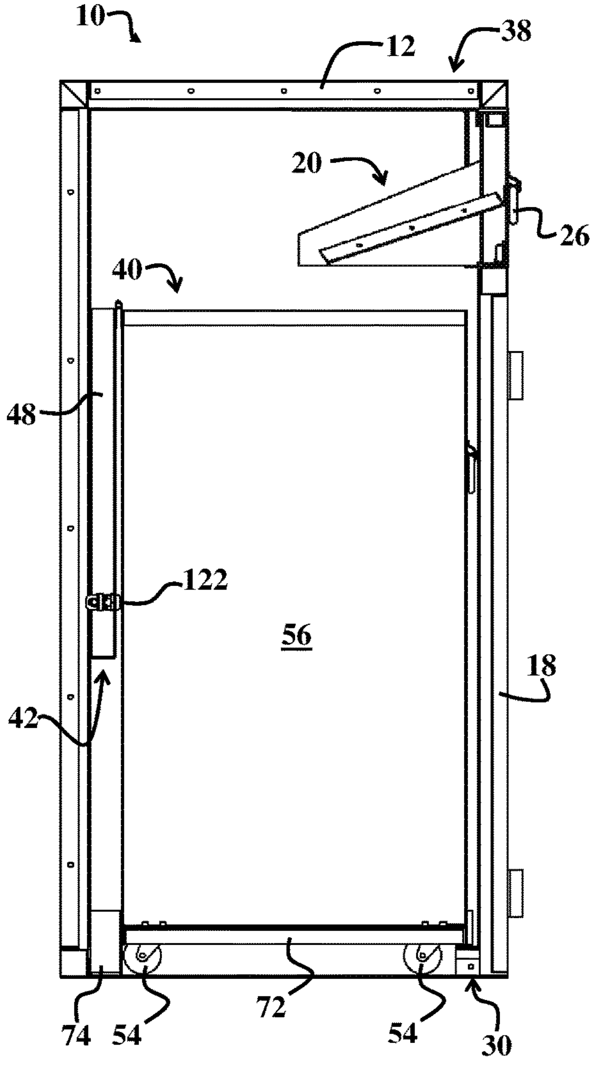

FIG. 4 shows a front view of the example secure collection bin system 10 of FIGS. 1-3, and further shows cross-section lines (5) corresponding to a cross-sectional view of FIG. 5.

FIG. 5 shows a cross-sectional view of the secure collection bin system 10 of FIGS. 1-4, as indicated in FIG. 4, and further illustrates additional features, including an inner bin lower-edge bevel 72, a lower rod catch 30 for a rod (e.g., the lower rode 36 of FIG. 2) of a multi-point lockable latch (e.g., including the mechanisms 30-36 of FIG. 2, and key actuation mechanism 22 of FIG. 1), a rear chamber stopper 74, and so on.

The rear stopper 74 is approximately the width of the lip 48 of the inner bin flip-top lid 42, the top surface of which is substantially flush with a back surface of the inner bin 40 when the inner bin 40 is fully inserted into the outer bin 38.

The optional lower-edge bevel 72 facilitates positioning of and/or guiding of the inner bin 40, as the bevel 72 bumps the inner bin locating tracks, which run parallel to a lengthwise axis of the bevel 72, e.g., as discussed more fully below with reference to FIG. 13.

In the present specific embodiment, the inner bin lid 42 also includes a multi-point lockable latching mechanism (or collection of mechanisms) 122, which may be constructed similarly to the mechanisms 30-36 of FIG. 3.

Figure 6:
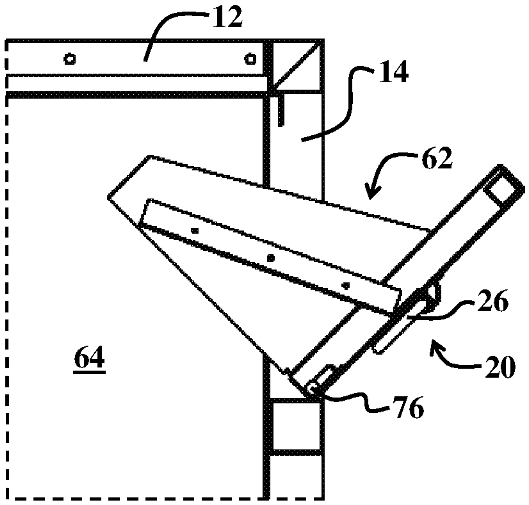
FIG. 6 shows the upper security chute door of FIG. 6 in an open position.

FIG. 6 shows the upper security chute door 20 of FIG. 6 in an open position. In FIG. 6, the upper security chute door 20 has been opened, e.g., via the front handle 26. Note that the security chute door 20 pivots about an axis implemented via a pivoting security chute door hinge 76.

The associated chute and slide 62 is then able to receive items, e.g., drives, into the outer bin chamber 64 once the security chute door 20 is closed. When the security chute door 20 is closed, items place in the chute and slide 62 then slide into the inner bin 40 of FIGS. 2-3, and 5.

Note that when the security chute door 20 is open, as shown in FIG. 6, the chute and slide 62 inhibit reaching around (e.g., with an arm) to pick up items that have been deposited into the associated inner bin of FIGS. 2-3, and 5.

Figure 7:
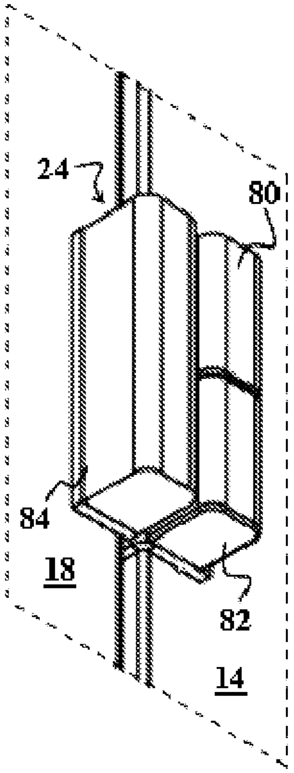
FIG. 7 shows an isometric view of securely covered lift-off hinges used for the outer bin door of the secure collection bin system of FIGS. 1-5.

FIG. 7 shows an isometric view of securely covered lift-off hinges 24 used for the outer bin door 18 of the secure collection bin system 10 of FIGS. 1-5. The example lift-off hinge 24 includes a first covered portion 84 that is mounted on a front surface of the security door 18, e.g., as shown on the door (also called the lower door) 18 of FIG. 1.

The first covered hinge portion 84 is rigidly coupled to (e.g., via welding) a second hinge portion 80 and pivotally coupled to a third hinge portion 82. The third hinge portion 82 is rigidly coupled to a right side panel 14 of the accompanying secure bin collection system 10, e.g., the right side panel 14 as shown in FIG. 1.

The second hinge portion 80 may have an inner rod 88 that fits concentrically and pivotally within an opening in the third hinge portion 82. With reference to FIGS. 1 and 6, note that to remove the outer bin door 18 by lifting the door 18 up, such that the second hinge 80 portion disengages from the third hinge portion 82, the outer bin door 18 should be sufficiently opened so that upper edges of the door 18 clear a top portion of a door frame of the outer bin 38.

Figure 8:
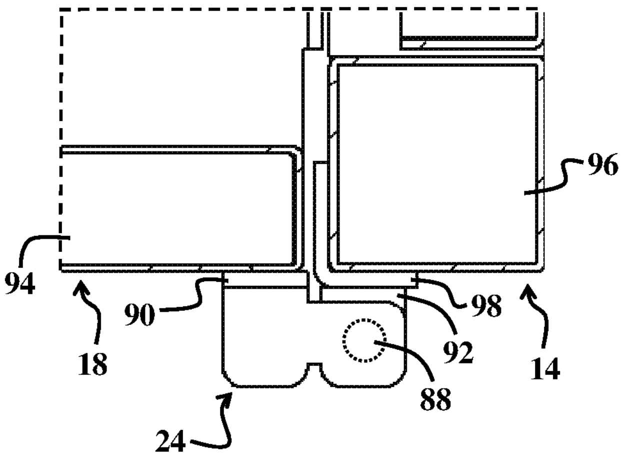
FIG. 8 shows a top view of the lift hinge shown in FIG. 7 and further illustrates cross-sectional detail of brackets, showing how the lift-off hinges are mounted and secured to the outer bin.

FIG. 8 shows a top view of the lift hinge 24 shown in FIG. 7 and further illustrates cross-sectional detail of brackets 90, 92, 98, showing how the lift-off hinges 24 are mounted and secured to the outer bin.

With reference to FIGS. 6 and 7, an example right outer bin door frame member 94 is welded or securely affixed to the first hinge portion 84 of FIG. 7. The third hinge portion 82 is welded to or securely affixed to (between brackets 92, 98) a forward frame member 96 of the right panel 14 of the accompanying outer bin housing 38 of FIG. 1.

Figure 9:
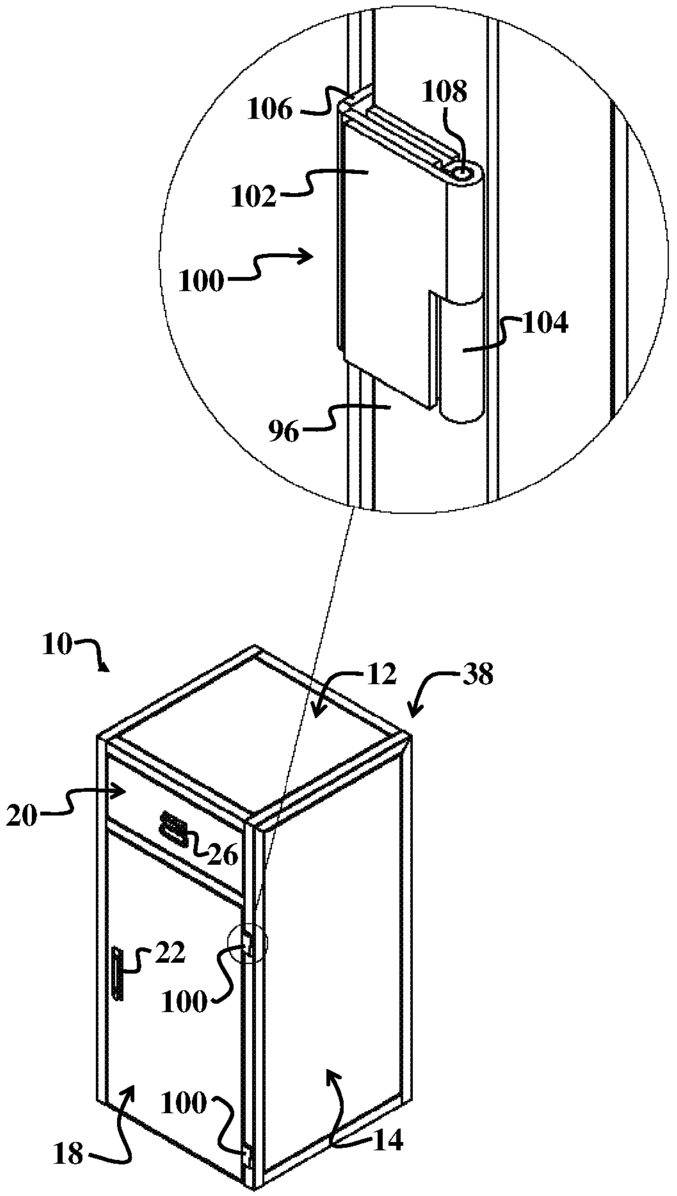
FIG. 9 illustrates an alternative implementation of the lift-off hinge of FIGS. 7-8.

FIG. 9 illustrates an alternative implementation 100 of the lift-off hinge 24 of FIGS. 7-8. The alternative lift-off hinge 100 is shown in the closed position with a first bracket piece 102 with a surface that extends approximately parallel to a surface of the outer bin door 18. The first bracket piece is welded to a second ninety-degree angled bracket piece 106, which is bonded to a side of the right outer bin door frame member 94.

A cylindrical portion of the first bracket piece slidably and rotatably fits over a shaft 108 of a third bracket piece 104. The third bracket piece 104 is welded to the forward frame member 96 of the right panel 14 of the accompanying outer bin housing 38.

The bracket pieces 102-106 are arranged so that the door 18 may be opened, such that it pivots about the shaft 108. Once the door 18 is opened, the door 18 and accompanying bracket pieces 102, 106 can be lifted up and off of the shaft 108.

Note that when opening the door 18 to remove the inner bin 40 of FIGS. 1-2, the door 18 is preferably opened to at least 90-degrees relative to the closed position. When the door 18 is opened 90-degrees, an outer surface of the door 18 will be approximately parallel to the outer surface of the right panel 14.

Figure 10:
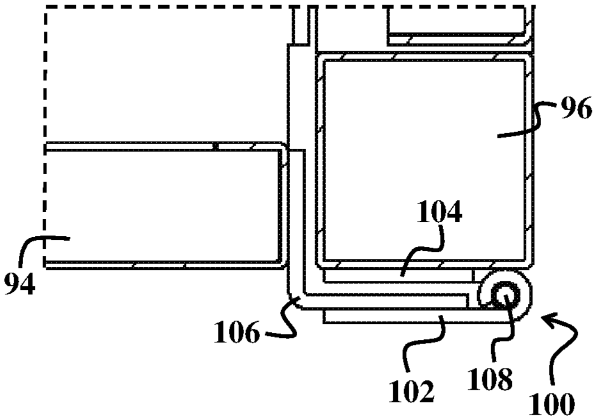
FIG. 10 illustrates a top cross-sectional view of the lift-off hinge of FIG. 9 when the lift-off hinge is in a closed position.

FIG. 10 illustrates a top cross-sectional view of the lift-off hinge 100 of FIG. 9 when the lift-off hinge 100 is in a closed position.

Note that, in the present example embodiment, the first bracket piece 102 is welded to the ninety-degree angled bracket piece 106. However, the bracket pieces 102, 106 may be formed as one piece, without departing from the scope of the present teachings.

Furthermore, the third bracket piece 104 is welded to the forward frame member 96 of the right panel 14 (e.g., as shown in FIG. 9). However, anti-tamper screws or other suitable mechanisms for securing the third bracket piece 104 to the forward frame member 96 may be employed, without departing from the scope of the present teachings.

Figure 11:
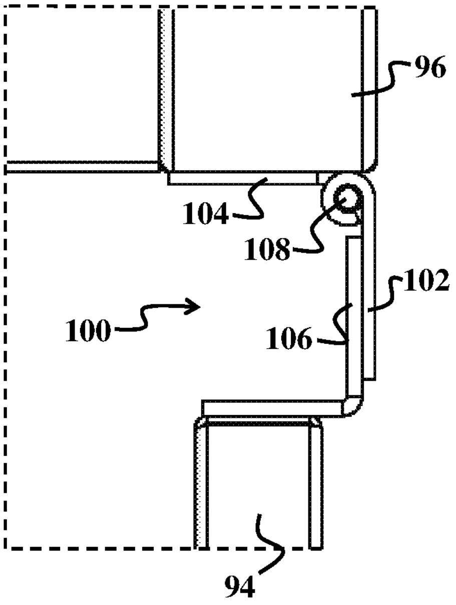
FIG. 11 illustrates a top cross-sectional view of the lift-off hinge of FIG. 9 in an open position.

FIG. 11 illustrates a top cross-sectional view of the lift-off hinge 100 of FIG. 9 in an open position. In FIG. 11, the door 18 of FIG. 9 has been opened ninety degrees, e.g., so as to allow removal of the inner bin 40 of FIGS. 2-3.

Figure 12:
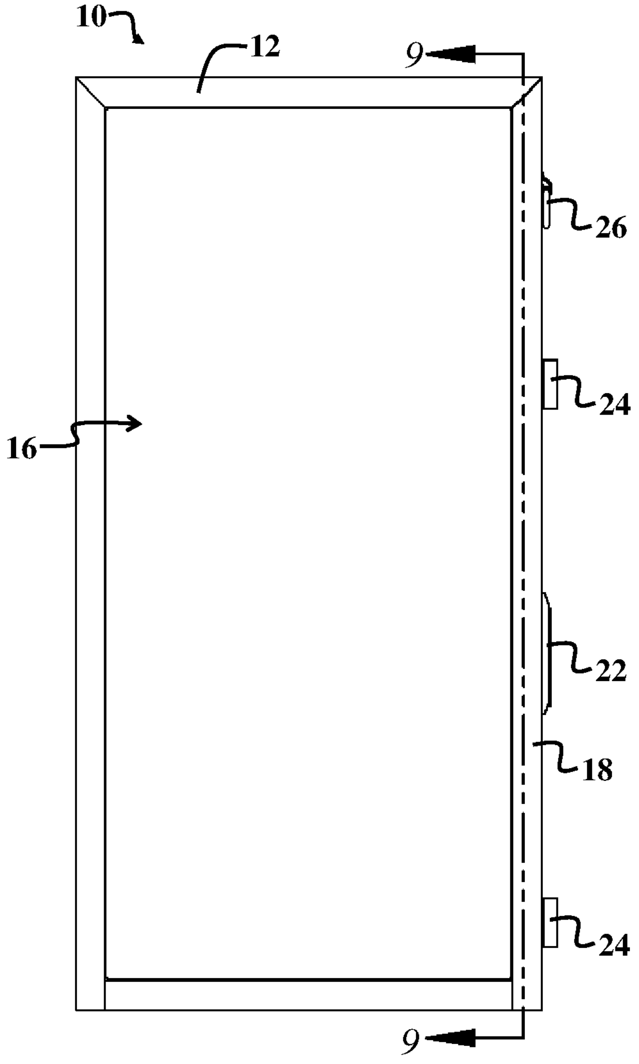
FIG. 12 shows a side view of the example secure collection bin system of FIGS. 1-5, and further shows cross-section lines corresponding to a cross-sectional view of FIG. 13.
Figure 13:
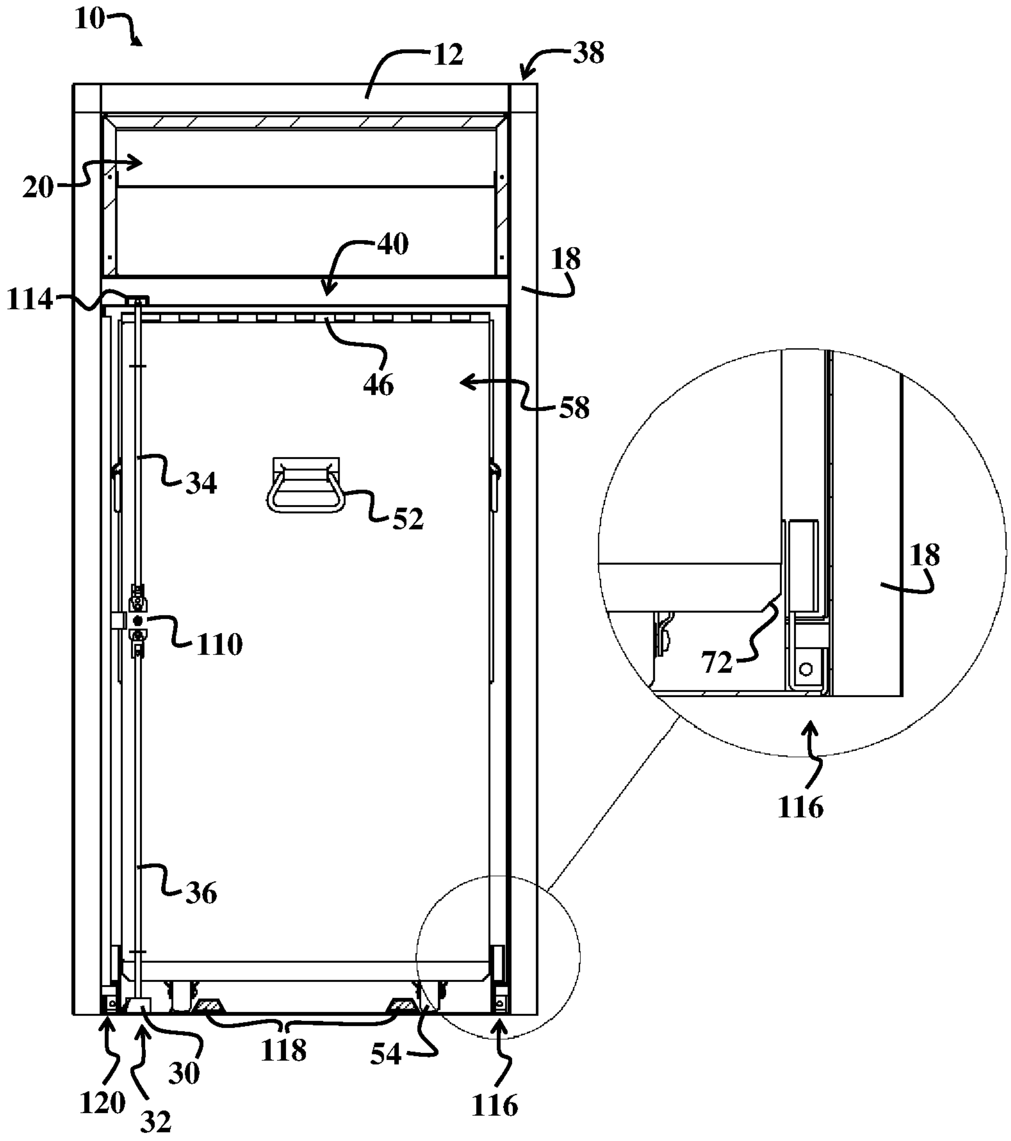
FIG. 13 shows a cross-sectional view of the secure collection bin system of FIGS. 1-5, and further illustrates additional features, including inner bin locating guard tracks (also simply called inner bin tracks) and optional wheel guide tracks 118.

FIG. 12 shows a side view of the example secure collection bin system 10 of FIGS. 1-5, and further shows cross-section lines (9) corresponding to a cross-sectional view of FIG. 13.

FIG. 13 shows a cross-sectional view of the secure collection bin system 10 of FIGS. 1-5, and further illustrates additional features, including inner bin locating guard tracks (also simply called inner bin tracks) 116, 120 and optional wheel guide tracks 118.

The multi-point lockable latch mechanism 32 is shown including rod catches 32, 114 that receive ends of rods 36, 34 when a rotating mechanism 110 is actuated, e.g., using a valid key (e.g., via the lever and key opening 22 of FIG. 1) and accompanying actuation mechanism (e.g., knob, slider, key rotation mechanism, etc.).

Optional wheel guide tracks 118 are shown for illustrative purposes. The wheel guide tracks 118 are beveled to facilitate guiding the wheels 54 and accompanying inner bin 40. Note that (longitudinal axis of) the tracks (also called bin-locating guard tracks or inner bin locating tracks) 116, 120, including wheel guide tracks 118, are oriented approximately perpendicular to the front side panel 58 of the inner bin 40 and parallel to the direction of motion of the inner bin 40 when it is removed from or placed inside the outer bin 38.

Figure 14:
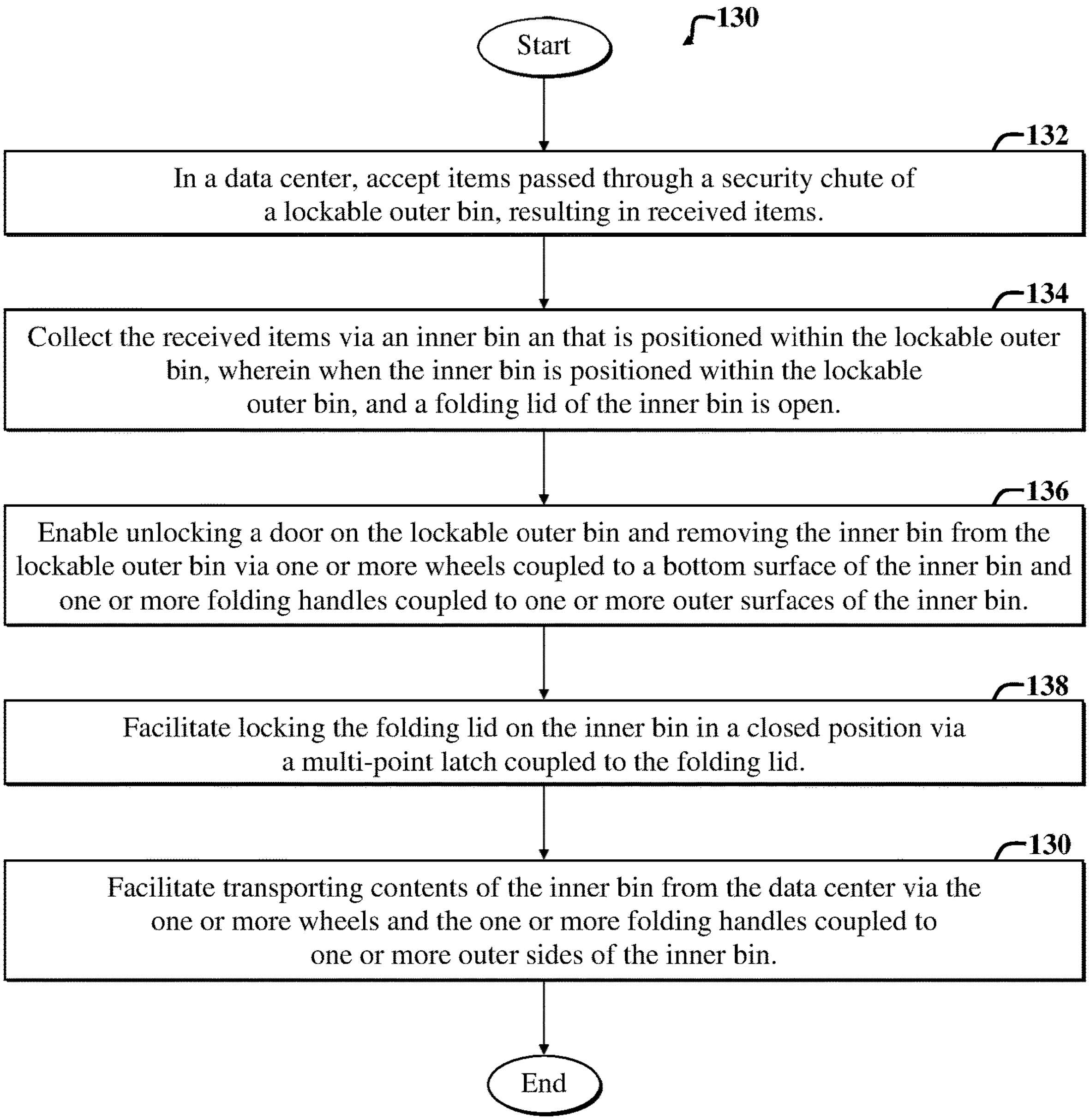
FIG. 14 is a flow diagram of an example method that is usable with the embodiments of FIGS. 1-13.

FIG. 14 is a flow diagram of an example method 130 that is usable with the embodiments of FIGS. 1-13. The example method 130 facilitates secure collection and transport of items from a data center, e.g., for the purposes of subsequent disposal.

With reference to FIGS. 2 and 10, a first step 132 of the method 130 of FIG. 14 includes accepting the items passed through a security chute (e.g., the chute and slide 62) of a lockable outer bin (e.g., the bin 38 of FIG. 2), resulting in received items (e.g., drives for subsequent transport and/or disposal).

A second step 134 includes collecting the received items via an inner bin (e.g., the inner bin 40 of FIG. 2) that is positioned within the lockable outer bin (e.g., the outer bin 38 of FIGS. 1-5), such that when the inner bin is positioned within the lockable outer bin, a folding lid (e.g., the flip-top lid 42 of FIGS. 2 and 3) of the inner bin is open (e.g., as shown in FIG. 3).

A third step 136 includes enabling unlocking a door (e.g., the door 18 of FIGS. 1-5) on the lockable outer bin and removing the inner bin from the lockable outer bin via one or more wheels (e.g., the wheels 54 of FIGS. 2, 3, 5, 9) coupled to a bottom surface of the inner bin and one or more folding handles (e.g., the folding handles 50, 52 of FIG. 3) coupled to one or more outer surfaces (e.g., surfaces of the bin sides 56, 58 of FIG. 3) of the inner bin.

A fourth step 138 includes facilitating locking the folding lid on the inner bin in a closed position via a multi-point lockable latch (e.g., mechanisms 32 FIGS. 2, 3 and 9) coupled to the folding lid (e.g., the folding lid 42 of FIGS. 2-3).

A fifth step 140 includes facilitating transporting contents of the inner bin from the data center via the one or more wheels and the one or more folding handles coupled to one or more outer sides of the inner bin.

Note that the example method is illustrative and may vary, without departing from the scope of the present teachings. For example, the example method 130 may be modified to further specify that the lockable outer bin fits approximately within a tile of the data center; the items include one or more hard drives to be removed from a data center; that the items include one or mother boards to be removed from the data center for the purposes of transport and disposal, and so on.

The example method 130 may further specify that when the folding lid of the inner bin is open when the inner bin is within the outer bin, a top surface of the folding lid is positioned approximately flush against an outer surface of a side of the inner bin. The folding lid may include a lip (e.g., the lip 48 of FIGS. 2, 3, 5) that extends from at least three edges of an inner surface of the folding lid. This helps to prevent gaps or seams in the interface between the lid and the accompanying housing walls that can be easier to pry open, e.g., with a crowbar.

The example method 130 may further specify, or alternatively specify, that the outer bin includes a security chute (e.g., the chute and slide 62 of FIG. 2) for accepting the deposit of one or more items; an inner chamber (e.g., the chamber or compartment 64 of FIG. 2); and a first hinged door (e.g., the door 18 of FIGS. 1-3) equipped with a multi-point lockable latch (e.g., mechanisms 30-36 of FIG. 2 and 22 of FIG. 1) to secure the first hinged door shut.

The inner bin may be sized to fit an inner bin sized to fit within the inner chamber, such that when the first hinged door is closed that a front surface of the inner bin (e.g., corresponding to the front side 58 of the bin 40 in FIGS. 2-3) sits approximately flush (e.g., as shown in FIG. 5) with an inner surface of the first hinged door.

The example method 130 may further, or alternatively, specify that the inner bin may include a hinged lid (e.g., the lid 42 of FIGS. 2-3), wherein the hinged lid is configured to remain open (e.g., as shown in FIG. 5) when the inner bin is within the inner chamber, and to remain folded approximately flush against a back surface of the inner bin; a second multi-point lockable latch (e.g., the latch 122 of FIG. 5) to secure the hinged lid shut; and one or more wheels (e.g., the wheels 54 of FIG. 5). coupled to a base of the inner bin.

The outer bin may be sized such that the outer bin is sized such that a base of the outer bin exhibits a rectangular or square footprint that approximately matches the dimensions of a data center tile. For instance, the footprint may be substantially square and approximately 24" by 24". The outer bin may be approximately 48" tall.

The outer bin and the inner bin may be made substantially of metal or other material suitable for a given implementation. The inner chamber includes one or more locating tracks (e.g., the tracks 116, 120, 118 of FIG. 13) extending approximately perpendicularly from the first hinged door (e.g., the door 18 of FIGS. 1-3) when the first hinged door is closed.

The inner bin may be sized such that exterior surfaces of opposite side walls of the inner bin are approximately separated from inter surfaces of opposite side walls of the inner chamber (e.g., the chamber 64 of FIG. 2) by a space determined by a width of the one or more inner bin locating tracks (e.g., tracks 116 of FIG. 13, which may facilitate maintaining preferred separation distances, tolerances, and so on between the inner bin and associated outer bin.

The inner chamber may further include one or more wheel guide tracks mounted to an inner bottom surface of the outer bin. One more bottom edges of the inner bin include one or more bevels, whereby the bevels are configured to interact with the one or more inner bin locating tracks to facilitate positioning the inner bin within the inner chamber.

The example method 130 may further specify that the first hinged door is coupled to the outer bin via one or more lift-off hinges. The one or more lift-off hinges include covers for inhibiting tampering of the hinges. The one or more lift-off hinges may be configured to enable removal of the first hinged door from the outer bin when the first hinged door is opened.

The one or more lift-off hinges may be configured to enable opening of the first hinged door to at least a sixty degree angle relative to a plane of an external surface of a side of the outer bin or inner bin or plane thereof.

The inner bin may include one or more folding handles (e.g., handles 50, 52 of FIG. 2) coupled to one or more external sides of the internal bin, such that the one or more handles are usable to facilitate moving the inner bin.

The example method may further specify use of a scanning device in communication with a first mechanism (e.g., a motor) for facilitating automatic opening of the chute and slide (e.g., via the security chute door 20 of FIG. 2). The scanning device (e.g., the device 28 of FIG. 1) may include or implement a mechanism for scanning a code affixed to the one or more items (to be collected and securely transported) and logging information in a database. The information to be logged may be associated with the scanning device, the associated secure destruction bin, and/or the one or more items via the code.

Although the description has been described with respect to particular embodiments thereof, these particular embodiments are merely illustrative, and not restrictive. For example, embodiments may be adaptable to other types of materials besides electronic devices or media. Aspects of the containment system may be adaptable to handle paper, plastics, metals, or other material, items or information.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A secure deposit system comprising:

an outer bin comprising:

a security chute for accepting deposit into the outer bin, of an electronic item storing electronic content;

a security chute door moveable between a closed position and an open position to control external access to the security chute;

a scanning mechanism including a scanner to capture a preauthorization code affixed to the electronic item and a copier to copy the electronic content prior to depositing the electronic item;

one or more processors and logic encoded in software, hardware, or a combination of both, for execution by the one or more processors and when executed, operable to analyze the preauthorization code to determine whether the electronic item is acceptable and usable to unlock the security chute door for collection or the electronic item is unacceptable and unable to be used to open to the security chute door, wherein the scanning device is configured to actuate a locking mechanism to electrically unlock the security chute door enabling the external access upon the determining that the electronic item is acceptable, and to maintain lock of the security chute door preventing the external access upon the determining that the electronic item is rejectable;

an inner chamber;

a hinged door equipped with a first multi-point lock comprising at least three locking points including an upper rod end, a lower rod end, and a latch mechanism configured to be moved by a first lock to prevent or to permit external access to the inner chamber; and an inner bin sized to fit within the inner chamber, wherein the inner bin comprises:

a hinged lid configured to be in an open position against a back surface of the inner bin when the inner bin is in the inner chamber, the hinged lid including a lip extending from the hinged lid and over respective interfaces of the hinged lid and respective walls of the inner bin when the hinged lid is in a closed position; and a second lock to secure the hinged lid in the closed position when the inner bin is removed from the outer bin, wherein the outer bin further includes a stopper sized with a width that is at least approximately a width of the lip, to stop movement of the inner bin when the inner bin is inserted into the outer bin and the hinged lid is in the open position.

2. The secure deposit system of claim 1, wherein the security chute includes a slide pivotally coupled to one or more interior portions of the outer bin and configured to pivot from an upright position when the security chute door is in the open position to a tilted position when the security chute door is in the closed position for the electronic item to slide into the inner bin.

3. The secure deposit system of claim 1, wherein the preauthorization code is a quick response (QR) code, Radio Frequency Identification (RFID) tag, bar code, visible number, or visible pattern.

4. The secure deposit system of claim 1, wherein the scanning device includes a camera coupled to the scanning device to capture a visual image of the electronic item.

5. The secure deposit system of claim 1, wherein the scanning device is configured to communicate information associated with the electronic item via the preauthorization code to a database for logging the information.

6. The secure deposit system of claim 1, wherein the upper rod end is configured to engage a top catch when extended by the latch mechanism and to disengage when retracted by the latch mechanism, the lower rod end is configured to engage a bottom catch when extended by the latch mechanism and to disengage when retracted by the latch mechanism, and the latch mechanism is configured to engage a side panel catch of the outer bin.

7. The secure deposit system of claim 1, wherein the second lock is configured to selectively prevent access and enable access to the inner bin via one or more keys and is coupled to a second multi-point lock to secure the hinged lid at multiple points along a front of the hinged lid when the inner bin is removed from the inner chamber.

8. The secure deposit system of claim 1, wherein the stopper is further sized to engage the back surface of the inner bin when the inner bin is inserted into the outer bin.

9. The secure deposit system of claim 1, wherein the electronic item includes a digital memory device, and wherein the inner bin is configured for removal from the outer bin and thereafter locking shut of the hinged lid on the inner bin, for transport and destruction of the electronic item.

10. A secure deposit system comprising:

a first enclosure comprising:

a housing having a scanning mechanism including a scanner to capture a preauthorization code affixed to an electronic item and a copier to copy electronic content stored in the electronic item, prior to depositing the electronic item;

a hinged door equipped with a first multi-point lock comprising at least three locking points including an upper rod end, a lower rod end, and a latch mechanism, configured to prevent or to permit external access to a lower compartment;

a security chute door exposing a security chute with a slide in an upright position when the security chute door is open and enabling the slide to pivot to a downward position when the security chute door is closed;

one or more processors and logic encoded in one or more non-transitory media for execution by the one or more processors and when executed, operable to analyze the preauthorization code to determine whether the electronic item is authorized and able to be used to open the security chute door for disposal or the electronic item is unauthorized and unable to be used to open to security chute door, wherein the scanning device is configured to actuate a locking mechanism to electrically unlock the security chute door enabling external access to the security chute to accept deposit of the electronic item upon the determining that the electronic item is acceptable, and to maintain lock of the security chute door preventing the external access upon the determining that the electronic item is rejectable;

the lower compartment for removably receiving a second enclosure, wherein the second enclosure, when placed inside the lower compartment, is configured to receive the electronic item that slides down the security chute when the security chute door is closed;

the second enclosure including a hinged lid configured to be in an open position against a back surface of the first enclosure when the second enclosure is in the lower compartment, the hinged lid including a lip extending around the hinged lid and over respective interfaces of the hinged lid and respective walls of the second enclosure when the hinged lid is in a closed position; and wherein the first enclosure further includes a stopper sized with a width that is at least approximately a width of the lip to stop movement of the second enclosure when the second enclosure is inserted into the first enclosure and the hinged lid is in the open position.

11. The secure deposit system of claim 10, wherein the preauthorization code is a quick response (QR) code, Radio Frequency Identification (RFID) tag, bar code, visible number, or visible pattern.

12. The secure deposit system of claim 10, wherein the scanning device includes a camera coupled to the scanning device to capture a visual image of the electronic item.

13. The secure deposit system of claim 10, wherein the electronic item includes electronic content stored in the electronic item and the scanning device includes an image copier to copy the electronic content for other storage, prior to depositing the electronic item.

* * * * *